US008156182B2

(12) United States Patent  
Hawkins (10) Patent No.: US 8,156,182 B2
(45) Date of Patent: Apr. 10, 2012

(54) SYSTEM AND METHOD FOR INTER-PLATFORM COMMUNICATIONS BLOCKING

(75) Inventor: Johnny Hawkins, Kansas City, MO (US)

(73) Assignee: Embarq Holdings Company LLC, Overland Park, KS (US)

( * ) Notice: Subject to any disclaimer, the term of this patent is extended or adjusted under 35 U.S.C. 154(b) by 0 days.

(21) Appl. No.: 12/850,749

(22) Filed: Aug. 5, 2010

(65) Prior Publication Data

US 2010/0323675 A1 Dec. 23, 2010

Related U.S. Application Data

(63) Continuation of application No. 12/116,044, filed on May 6, 2008, now Pat. No. 7,797,379.

(51) Int. Cl.
*G06F 15/16* (2006.01)

(52) U.S. Cl. ........ 709/203; 709/224; 709/206; 709/223; 709/202; 709/231; 709/204; 709/225; 370/229; 370/352; 370/401; 370/465; 455/466; 719/326; 719/325; 719/315; 719/313; 719/318

(58) Field of Classification Search .................. 709/203, 709/225, 206, 202, 223

See application file for complete search history.

(56) References Cited

U.S. PATENT DOCUMENTS

| | | | |
|---|---|---|---|
| 7,370,278 B2 | 5/2008 | Malik et al. | |
| 7,370,289 B1 | 5/2008 | Ebert et al. | |
| 7,797,379 B2 * | 9/2010 | Hawkins | 709/203 |
| 2008/0101584 A1 | 5/2008 | Gray et al. | |
| 2008/0102783 A1 | 5/2008 | Bustamante | |
| 2008/0107258 A1 | 5/2008 | Fitzsimmons | |
| 2008/0295000 A1 * | 11/2008 | Kieselbach et al. | 715/752 |
| 2009/0030989 A1 * | 1/2009 | Maresh et al. | 709/206 |

* cited by examiner

*Primary Examiner* — Jude Jean Gilles (57) ABSTRACT

A system and method for preventing unwanted communications. A communication is received from a sending party. Input indicating the communication is to be filtered is received. Filtering information is extracted from the communication. The filtering information is distributed to multiple telecommunications platforms. The communication and future communications are blocked across the multiple telecommunications platforms utilizing the filtering information.

20 Claims, 6 Drawing Sheets

SYSTEM AND METHOD FOR INTER-PLATFORM COMMUNICATIONS BLOCKING

CROSS-REFERENCE TO RELATED PATENT APPLICATIONS

This patent application is a continuation of U.S. patent application Ser. No. 12/116,044, filed May 6, 2008, now U.S. Pat. No. 7,797,379. The teachings and disclosure of which are hereby incorporated in their entireties by reference thereto.

BACKGROUND OF THE INVENTION

The use of and development of communications has grown nearly exponentially in recent years. The growth is fueled by larger networks with more reliable protocols and better communications hardware available to service providers and consumers. With the increased improvements in communications technologies have also come an increase in unwanted communications. Unwanted email messages, phone call solicitations, text messages, advertisements, and even junk faxes waste natural resources, bandwidth, communications plan limitations, and individual's time.

Attempts to regulate these unwanted messages through legislation, filters, and blocking services have had limited success. Many potential solutions have focused on addressing the unwanted messages for each device or phone number. As a result, users continue to be deal with junk communications in all forms.

BRIEF SUMMARY OF THE INVENTION

One embodiment provides a system and method for preventing unwanted communications. A communication may be received from a sending party. Input indicating the communication is to be blocked may be received. Filtering information may be extracted from the communication. The filtering information may be distributed to multiple telecommunications platforms. The communication and future communications across the multiple telecommunications platforms may be blocked utilizing the filtering information.

Another embodiment provides a server for filtering communications. The server may include an interface operable to communicate with registered devices. The interface receives input indicating a communication is to be filtered. The server may also include an extractor operable to extract filtering information from the communication. The server may also include a memory operable to store the filtering information to filter future communications with the registered devices. The server may also include a processor operable to filter future communications to the registered devices across a number of telecommunications platforms utilizing the filtering information.

Yet another embodiment provides a communications server for blocking communications. The communications server may include a processor for executing a set of instructions and a memory for storing the set of instructions. The set of instructions are operable to receive a communication from a sending party, receive a input indicating the communication is to be filtered, extract filtering information from the communication, communicate the filtering information to the number of telecommunications platforms, and block the communication and future communications across the number of telecommunications platforms utilizing the filtering information.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Illustrative embodiments provide a system and method for filtering unwanted communications in real-time. Communications filtered or blocked are filtered for a number of devices registered for use by the user. Devices as used herein include communications modules, applications, software, hardware, devices, and combinations of each. Filtering information is extracted from the unwanted communications and shared across the multiple devices. A real-time or recently receive communication may be blocked as well as future communications based on the blocking information. A user may review the filtering information at any time by accessing a portal, website, or application of a communications service provider. Additional filtering information may be extracted from the communication for blocking different types of communications. The user may select to share blocking information with other users in order to more effectively block unwanted communications.

Figure 1:
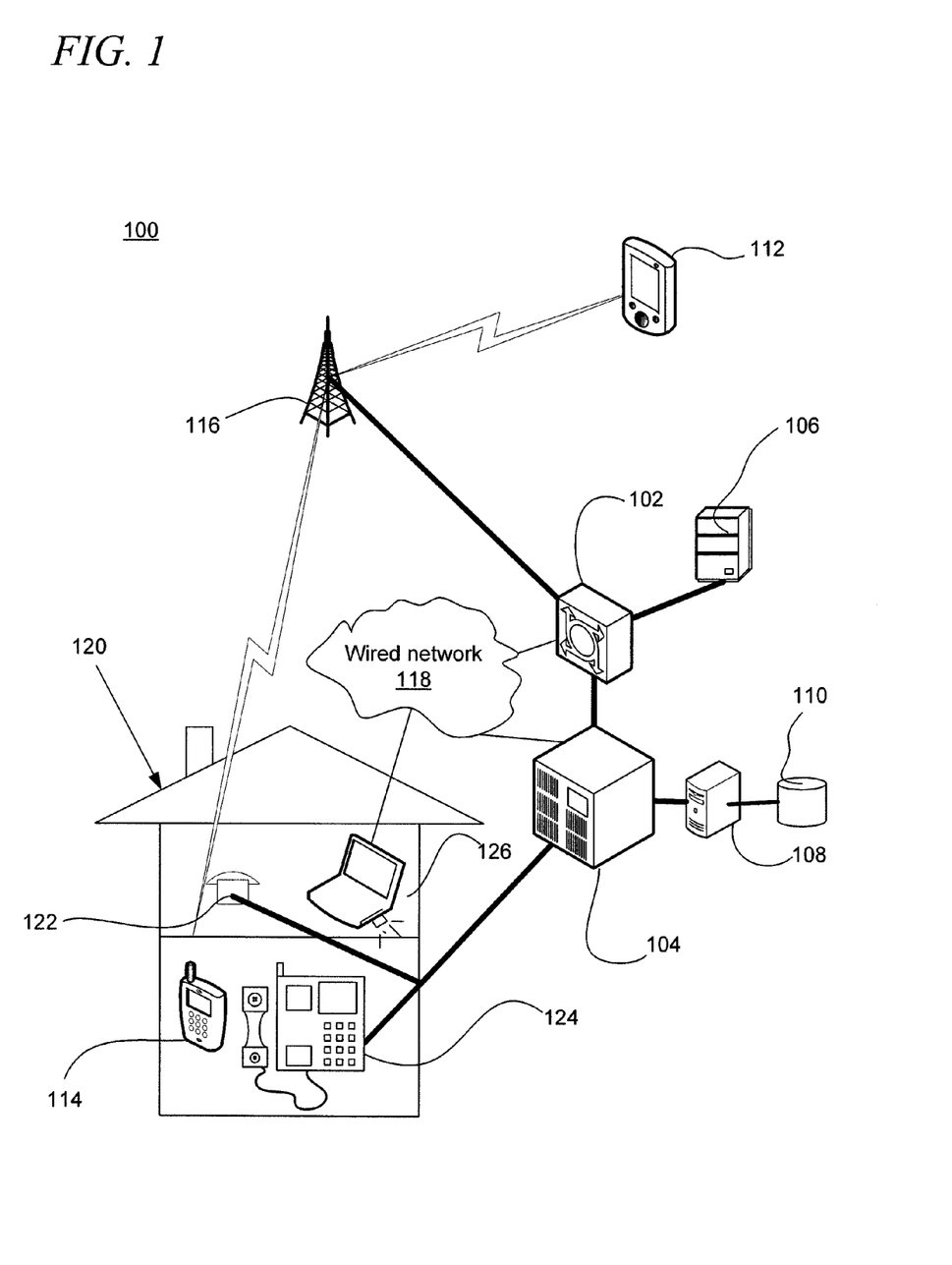
FIG. 1 is a pictorial representation of a communications environment in accordance with an illustrative embodiment.

FIG. 1 is a pictorial representation of a communications environment in accordance with an illustrative embodiment. The communications environment 100 of FIG. 1 includes various elements used for wireless and wired communication. The communications environment 100 includes a mobile switching center (MSC) 102, a local exchange 104, voicemail systems 106 and 108, a database 110, wireless devices 112 and 114, a transmission tower 116, a wired network 118, a home 120, home telephones 122 and 124, and a client 126. The different elements and components of the communications environment 100 may communicate using wireless communications including satellite connections and/or hard-wired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications environment 100 may occur on any number of networks which may include wireless networks, data or packet networks, cable networks, satellite networks, private networks, publicly switched telephone networks (PSTN), the wired network 118, or other types of communication networks. A communications network is the total infrastructures for sending and receiving messages and signals according to one or more designated formats, standards, and protocols. The networks of the communications environment 100 may represent a single communication service provider or multiple communications services providers. The features, services, and processes of the illustrative embodiments may be implemented by one or more elements of the communications environment 100 independently or as a networked implementation.

In one embodiment, the MSC 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home location register (HLR) and visitor location register (VLR) that may be used to implement different features of the illustrative embodiments. The voicemail system 106 may be an integrated part of the MSC 102 or alternatively may be an externally connected device.

In one embodiment, a centralized server within the communications environment 100 may include an integrated database for retrieving and storing blocking information, electronic profiles, and data. The blocking information may be used by one or more registered communications devices, software, and accounts of the user to block communications. The user may communicate, interact, or send and receive data, information, and commands to the server through the telephones 122 and 124, an Internet Protocol television, a soft phone, an email account, mp3 player, car computer, wireless devices 112 and 114, or the client 126. For example, a web portal, centralized application, or distributed application may be utilized by the user to register multiple communications devices and configure preferences for implementing communications blocking based on the blocking information. A soft phone is a software program for making telephone calls over the Internet or network connection using a general purpose computer rather than using dedicated voice communications hardware.

The MSC 102 and voicemail system 106 may include any number of hardware and software components. In one embodiment, the MSC 106 is an advanced intelligence network device with software modules equipped to perform communications blocking across mobile communications devices and other linked communications devices.

The local exchange 104, the MSC 102, and/or other elements of the communications environment 100 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network. VoIP works by sending voice information in digital form, such as packets, rather than using the traditional circuit-committed protocols of the publicly switched network. The local exchange 104 may be or include a feature server, a call control agent, or an IP gateway for implementing VoIP communications.

The communications environment 100 may further include any number of hardware and software elements that may not be shown in the example of FIG. 1. For example, in order to facilitate VoIP communications, the communications system and the MSC 102 and local exchange 104 in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other components of a wire line network, such as a data, PSTN, VoIP, or other wired network may implement the communications blocking in the communications environment 100.

The MSC 102 and the local exchange 104 may include an authentication space. The authentication space may be a partition, module, or other storage or memory of the server designated by the communications service provider. The authentication space may validate that a user or device, such as client 126, is allowed to authorize the MSC 102, local exchange 104, servers, switches, network devices, or corresponding voicemail systems 106 and 108 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be also used to create a secure connection between the client, wireless devices 112, 114, home telephones 122 and 124, or other device or application and the MSC 102, a server, or the local exchange 104.

The secure connection may be a virtual private network tunnel, an encrypted connection, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator or intercom system. In another embodiment, the home telephone 124 may be integrated with a personal computer, such as client 126.

The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications. A special dial tone, message, web alert, or other feedback may specify once or repeatedly that a blocking command has been entered. For example, the home telephones 116 and 118 may sound a double chirp when a call is initially blocked and subsequently the user may receive no indication that a communication is being blocked. The user may cancel use of any features by reentering the feature command or a cancellation command.

The home 120 may also include other communications devices including a gaming system, set-top box, Internet Protocol television, wireless tablet personal computer, or other communications elements that may benefit from communications blocking. For example, the user may select to block a commercial displayed on the television and the centralized server may similarly block email addresses and phone numbers associated with the commercial.

The client 126 may be a personal computer for performing and executing programs and instructions and accessing the wired network 118. However, the client 126 may be any computing devices suitable for communicating with the wired network 118 through a network connection. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. Alternatively, the client 126 may communicate with the wired network 118 through a wireless connection. A server, a communications management system, MSC 102 and local exchange 104 may use a graphical user interface (GUI), such as website or program accessible from the client 126 in order to enter and receive input preferences for blocking communications.

At any time, a user may select to enable, order, initiate, implement, or otherwise communications blocking features herein described. For example, the user may use a command that informs a function trigger of a device or application, such as the MSC 102, local exchange 104, wireless device 112 and 114, a centralized call blocking server, home telephones 122 and 124, or client 126, to implement call blocking. In one example, the user may submit a command to activate call blocking by dialing *2 on the home telephone 122, the user may or may not be required to then entering a pass code, account code, password, pin number, or other identifier. In another embodiment, a user may activate the feature by dialing *79 on a separate wireless device. The command may also be voice activated, time activated, preset by user selection or any other suitable option, setting, command, or user input. In another embodiment, the various features may be implemented using tactile commands.

Figure 2:
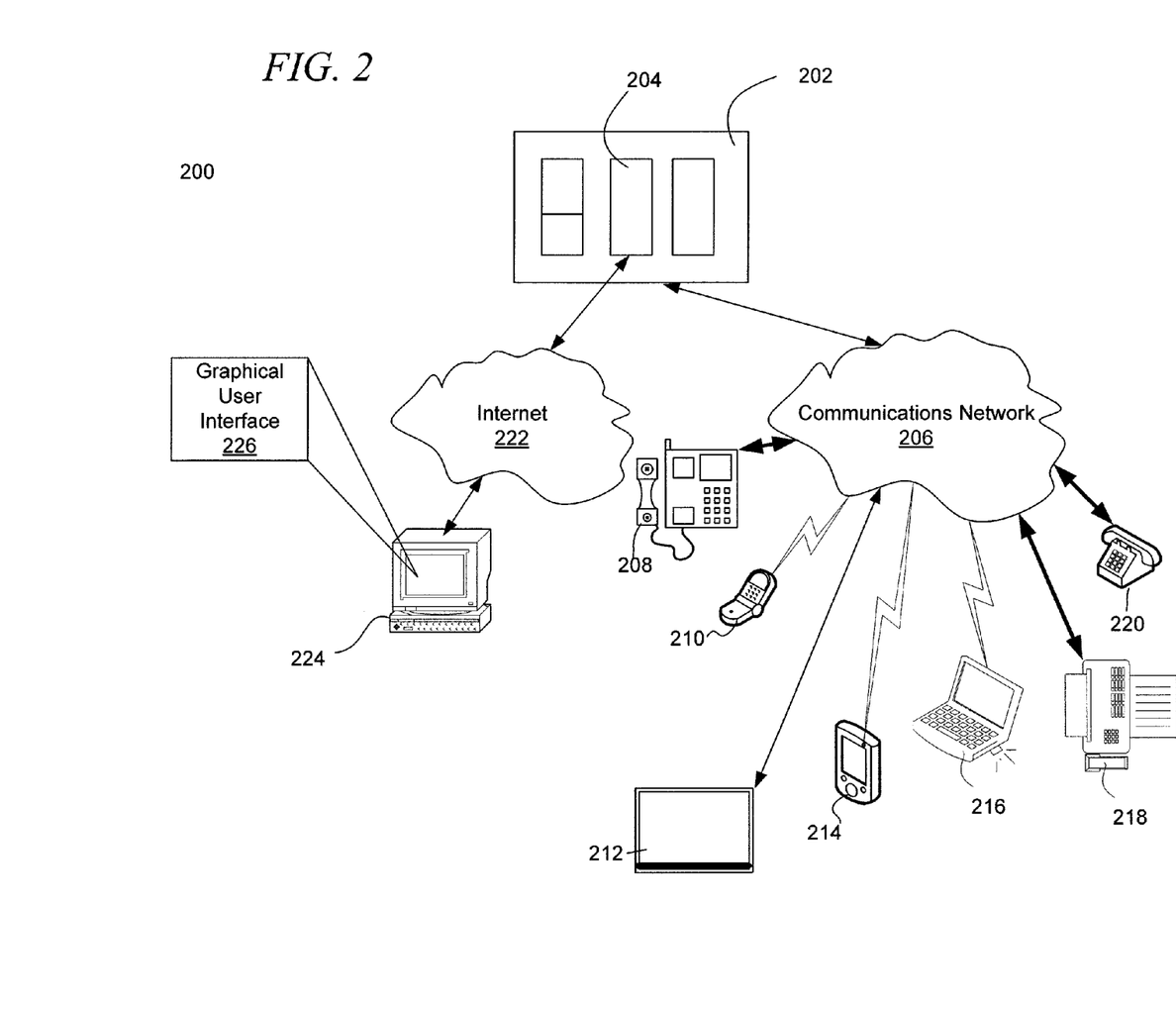
FIG. 2 is a pictorial representation of a communications system in accordance with an illustrative embodiment.

FIG. 2 is a pictorial representation of a communications system in accordance with an illustrative embodiment. The communications system 200 is a particular implementation of portions of the communications environment 100 of FIG. 1. The communication system 200 may include a communications management system 202, a server 204, a communications network 206, a VoIP phone 208, a cell phone 210, a television 212, a wireless device 214, a laptop 216, a fax machine 218, a standard telephone 220, the Internet 222, a client 224, and graphical user interface 226.

The communications management system 202 is one, or more devices utilized to enable, initiate, route, and manage communications between one, or more telecommunications platforms. The communications management system 202 may include one, or more devices networked to manage the communications network 202. For example, the communications management system may include any number of interconnected servers, routers, switches, or advanced intelligent devices.

The communications network 202 may send and receives the electronic control signals, data, and information through any number of transmission mediums. The communications network 202 may include various fiber optics, cables, transmission towers, antennas, or other elements for transmitting voice communications to the connected telephonic devices. The communications management system 202 and the communications network 206 function to transmit voice, data, and packet communications for the telecommunications platforms of the communications system 200, wirelessly or through hard-wired connections. The telecommunications platforms are telecommunications devices, applications, and contact methods that enable digital and analog communication of voice, data, packets, messages, and information. As shown in FIG. 2, the telecommunications platforms may include the voice over Internet Protocol (VoIP) phone 208, cell phone 210, television 212, wireless device 214, laptop 216, fax machine 218, POTS phone 220, and other telecommunications platforms. The telecommunications platforms may also include communications elements, such as soft phones, applications, and other software constructs.

The communications management system 202 may further include the server 204. The server 204 may be configured to receive and store filtering information as received from the telecommunications platforms registered to the user. In one embodiment, the server 204 may synchronize, distribute, or communicate the filtering information among the telecommunications platforms registered with the user so that filtering may be uniformly performed for each of the applicable platforms. In another embodiment, a number of users may select to further pool filtering information in a combined database of the server 204 for more effectively blocking unwanted communications. An embodiment of the server 204 is further described in FIG. 4.

In one embodiment, all incoming communications are routed to the respective telecommunications platform or element through the server 204. As a result, the server 204 provides a centralized way of filtering or blocking unwanted communications that are transmitted through the communications network 206. For example, based on previous filtering information, a phone call or text message to the cell phone 210 may be prevented from reaching the user. Correspondingly, the cell phone 210 does not ring or receive the corresponding text message when sent from a sending party that has been flagged to be blocked or otherwise filtered. The call or text message may also be flagged for rejection based on a phone number, IP address, area code, service provider, or other unique information.

In another embodiment, the server 204 may manage the filtering information received from each of the telecommunications platforms. The server 204 may update the filtering information as received by a user utilizing the VoIP phone 208, the cell phone 210, the television 212, the wireless device 214, the laptop 216, the fax machine 218, the standard phone 220 or through the graphical user interface 226 of the client 224. The filtering information may then be synchronized to each of the telecommunications platforms registered with the user by the server 204 based on a specified user preference. For example, the user preferences may specify that any time a communication is blocked by one of the telecommunications platforms, the filtering information extracted during the communication may be transmitted first through the communications network 206 to the server 204 and then subsequently transferred back to each of the telecommunications platforms. In one embodiment, the filtering information may be sent to each of the telecommunications platforms in the form of an update to a filtering file or filtering database stored locally by each of the telecommunications platforms. The filtering information may also be stored in a database file, program or other storage element locally in the telecommunications platform or in the server 204.

Figure 3:
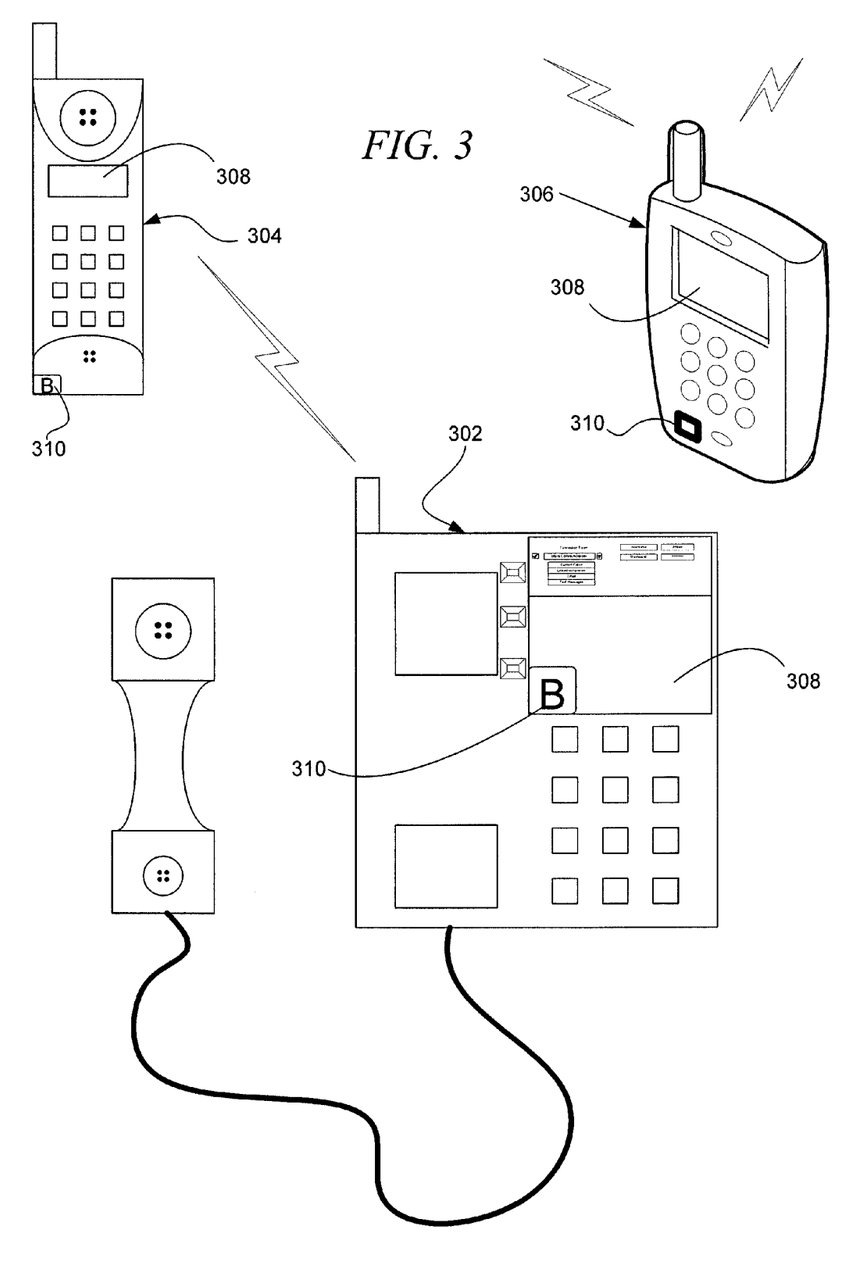
FIG. 3 is a pictorial representation of communications devices in accordance with an illustrative embodiment.

FIG. 3 is a pictorial representation of communications devices in accordance with an illustrative embodiment. FIG. 3. includes a VoIP phone 302, a handset 304, a cell phone 306, a display 308, and a filter button 310.

The VoIP phone 302 and the cell phone are particular implementations of the VoIP phone 208 and cell phone 210 of FIG. 2, respectively. The VoIP phone may alternatively be equipped for POTS communications or for wireless communications. The VoIP may include the handset 304 and the display 306. The display 306 may display filtering information, caller identification information, or other information applicable to controlling the VoIP phone 302 and communications.

In one embodiment, communication information may be communicated directly to the display. By selecting a button, icon, or indicator, such as the filter button, present on the VoIP phone 302, the handset 304, or the cell phone 306 may indicate that an incoming, ongoing, or past communication is to be filtered in the future. Once the filter button is selected, the applicable telecommunications platform may extract additional filtering information or may request that an interconnected device or program, such as a server, retrieve additional filtering information for blocking future communications. The user may also select an touch screen, soft button, scroll wheel, provide a voice command, or otherwise enter a command to automatically mark a communication to be filtered. A file, program, database, or filtering information may be uploaded to the VoIP phone 302 and the cell phone 306 by a server to prevent unwanted communications from reaching a user. In one embodiment, the user may receive any number of communications services which may include, data, VoIP, wireless, fax, POTS, IPTV, satellite, from a single communications service provider that manages the unwanted communications that reach the user through the registered telecommunications platforms.

The handset 304 may be equipped to share a communications line or link with the VoIP phone 302. For example, the handset 304 may be a cordless extension of the VoIP phone 302 utilizing any number or short-range cordless frequencies. In one embodiment, the handset 304 and the VoIP phone 302 communicate wirelessly to send and receive data, information, and voice communications. The handset 304 may also include the display 306 for displaying the communications or filtering information 308 or other information commonly displayed by a telephone. The handset 304 and the VoIP phone 302 may communicate using any number of frequencies, standards, or communications protocols, usually effective over short distances throughout a user's home or business.

In addition to the elements described, the telecommunications platforms may include hard keys, soft keys, touch screens, scroll wheels, track balls, or other interface elements. Hard keys are dedicated buttons or interface elements hard-coded for a single, unique, and consistent purpose. Examples of hard keys include the 12-buttons of the traditional alphanumeric keypad, the send/end keys commonly found on mobile phones, and buttons to initiate or end a speakerphone function.

The telecommunications platforms may also include soft keys. Soft keys are programmable buttons or interface elements. Soft keys are usually located alongside a display device and may perform different functions dependent on the text shown near the soft keys on the display. Examples of soft keys may include directories and speed dial lists. The filter button 310 may be a hard key, soft key, or other indicator.

Figure 4:
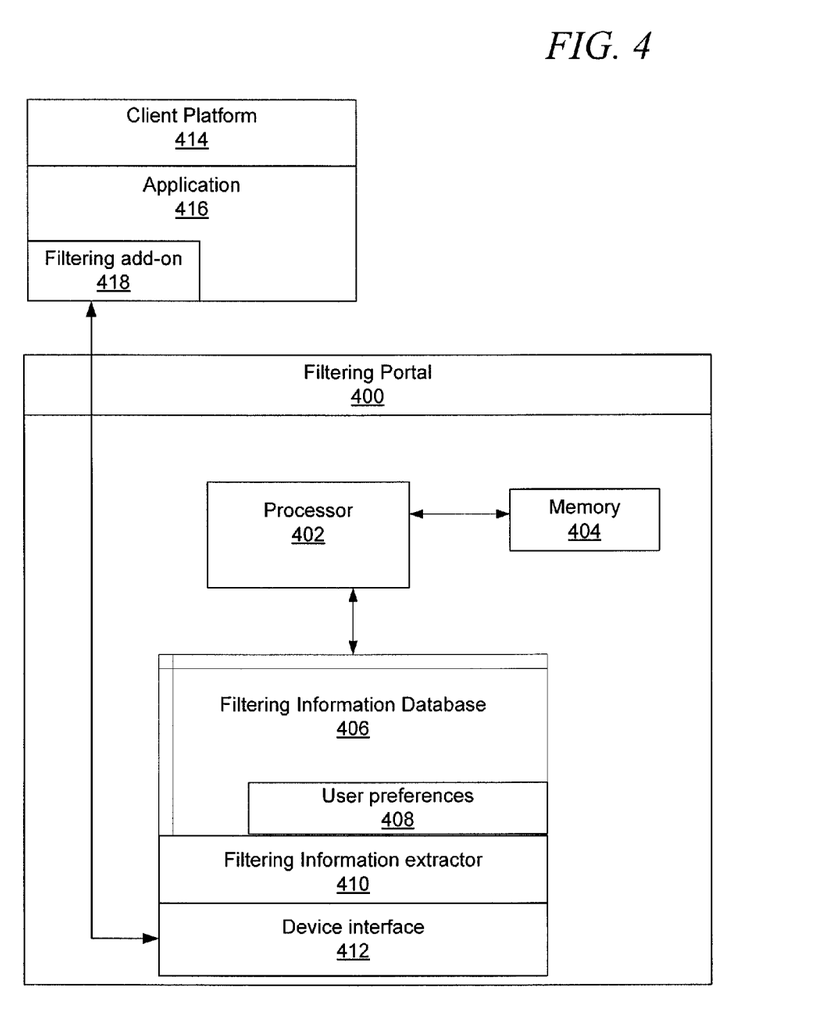
FIG. 4 is block diagram of a blocking portal in accordance with an illustrative embodiment.

FIG. 4 is block diagram of a blocking portal in accordance with an illustrative embodiment. The filtering portal 400 is a particular implementation of the server 204 of FIG. 2. In one embodiment, the filtering portal 400 may include a process 402, a memory 404, filtering information database 406, user preferences 408, filtering information extractor 410, and device interface 412. The filtering portal 400 may communicate with client 414, the client may include the application 416 and the filtering add-on 418.

The processor 402 is circuitry or logic enabled to control execution of a set of instructions. The processor may be a microprocessor, digital signal processor, central processing unit, or other device suitable for controlling an electronic device including one or more hardware and software elements, executing software, instructions, programs, and applications, converting and processing signals and information, and performing other related tasks. The processor 402 may be a single chip or integrated with other computing or communications elements.

The memory 404 is a hardware element, device, or recording media configured to store data for subsequent retrieval or access at a later time. The memory 404 may be static or dynamic memory. The memory 404 may include a hard disk, random access memory, cache, removable media drive, mass storage, or configuration suitable as storage for data, instructions, and information. In one embodiment, the memory 404 and processor 402 may be integrated. The memory may use any type of volatile or non-volatile storage techniques and mediums.

The filtering information database 406 is a database configured to store the filtering information that controls the filtering and blocking of communications to the client platform 414 and other user registered telecommunications platforms. The filtering information database 406 may represent the information, file, program, or other data that may be used by the filtering portal 400, the client platform 414, or other telecommunications platforms to filter incoming communications.

The user preferences 408 are the preferences for implementing the communications blocking feature performed by the filtering portal 400. In one embodiment, the user preferences 408 may control how and when filtering information is share between the telecommunications platforms registered with the user. For example, the client platform 414 may transmit newly added filtering information to the filtering information database 406 at specified intervals, such as once every three hours or once a day. Similarly, the filtering information may be sent from the filtering information database 406 to multiple telecommunications platforms registered with the user at pre-established intervals. For example, new filtering information may be automatically synchronized once saved in the filtering information database. In another example, the telecommunications platforms may be updated once a day during an off-peak hour in order to conserve bandwidth utilization.

The user preferences 408 may also control the commands utilized by the user to block an incoming communication and send filtering information to the filtering information database 406. For example, an icon may be used to block an incoming communication to an email application or an IPTV while a dialing code, such as *33 may be used for a VoIP phone, POTS phone, cell phone, and fax machine to block an incoming call or the most recently received call.

The filtering information extractor 410 is an engine configured to extract information from communications. The filtering information extractor 410 may be stored and executed in the filtering portal 400 as well as the client platform. In particular, the filtering information extractor 410 may retrieve communications and filtering information from an incoming communication including sending/call party, phone number, name, username, company name, and other caller identification or communication related information.

In another embodiment, the filtering information extractor 410 may actively search for filtering information beyond the information included in one or more blocked communications. The filtering information extractor 410 may use the filtering information extracted from the communications to data mine other applicable filtering information. As a result, the filtering information extractor 410 performs data mining using the original filtering information extracted from a blocked communication. For example, an email address may be traced back to an associated domain name or website. The website may list a number of phone numbers utilized by the company which may also be blocked from communicating with the client platform 414. In another example, the sending party may be a spammer and by retrieving an IP address utilized to send an original email other offending IP addresses and email addresses may be retrieved by the filtering information extractor 410 with the additional filtering information also be added to the filtering information database 406. As a result, the filtering portal 400 allows incoming communications to be blocked in real-time as well as future communications from filtering information extracted from the blocked communications and data mining resources by the filtering information extractor 410.

In another embodiment, the filtering information database 406 may be a database utilized by any number of users for compiling filtering information. Different blocking criteria, patterns, profiles, or other information may control how filtering information stored within the filtering information database 406 is applied for each user. For example, communications may be blocked based on classifications or types. The classifications or types may be determined by information legally required to be transmitted during a communication or based on information retrieved by the filtering information extractor 410. Applicable types of communications may include solicitations, charities, companies, male-enhancement products, religious groups, political groups or parties, education groups, or other similar classifications. The classifications may be individually made by the user based on user input or may be compiled from one or more users in the filtering information database. For example, an IP address or portions of an IP address known to be associated with a particular spammer or telemarketers may block both emails and VoIP calls originating from that IP address or a known variation of that number.

In one embodiment, by consistently blocking communications associated with charities, the filtering information database 406 may configure the user preferences 408 to automatically set all communications from known charities to be blocked. Alternatively, by blocking one or more communications for a charity, the user may be prompted to block all communications from charities or determine on a case by case basis.

The filtering information database 406 may include or may communicate with databases that track types of communications and sending parties. The databases may be commercially maintained databases by communications service providers, companies, government, or other groups for characterizing communications. The databases may be particularly directed to tracking all generally unwanted, unsolicited, or rejected communications. In one embodiment, the filtering information database 406 may track contact methods across various communications and messaging mediums, such as wireless, data, packet, analog, cellular, and satellite. The contact methods is the communications methods utilized by one or more individuals, companies, organizations, governments, or other groups. The communications methods may track ascertainable communications and filtering information, such as group name, aliases, location, area codes, phone numbers, domain names, IP addresses, addresses, shell companies, subsidiaries, message language, operating procedures, past history, state purposes, fines, records, reports, account numbers, and other information. As previously described, the filtering information may be utilized to determine whether communications received by the user may be unwanted or rejected based on previous selections. For example, the contact method may be stored as a profiler for each party that has or may communicate with the user. The profile may be stored and accessed by numerous users based on sharing, networking, and filtering preferences stored within the user preferences. The communications methods may be utilized by the user preferences for any number of users to best implement filtering preferences of a user across a number of services, accounts, and communications devices.

In one embodiment, the filtering information database 406 may generate and store a universal list of filtering information that may be used by all of the user's devices, services, and platforms. The universal list may be shared among multiple users based on a user selection to participate in a filtering program, wild group, or collaboration for the purpose of preventing unwanted communications.

The device interface 412 is the communications elements that manages communications with the telecommunications platforms including the client platform 414. The device interface 412 may be entirely software, hardware, or a combination of both. The client platform 414 may be configured to receiving filtering information from the client platform 412. The client platform communicates with the filtering information extractor 410 and the filtering information database 406 to make changes and updates. Additionally, the filtering information extractor 410 may access the communication through the device interface 412 to retrieve initial filtering information, such as caller identification information, sending party, IP or MAC addresses, and then subsequently mine available resources, such as the Internet, to retrieve more filtering information.

The client platform 414 is a particular implementation of the telecommunications platforms described in FIG. 2. In one embodiment, the client platform 414 may include the application 416. The application 416 is a program or module specially designed to perform a specific function directly for the user. In one embodiment, the application 416 may be a program that manages a user's network address book. The network address book is the contact information utilized by the user across multiple services provided by a communications service provider. In one embodiment, the filtering information database 406 may update a portion of the network address book to include filtering information.

Figure 5:
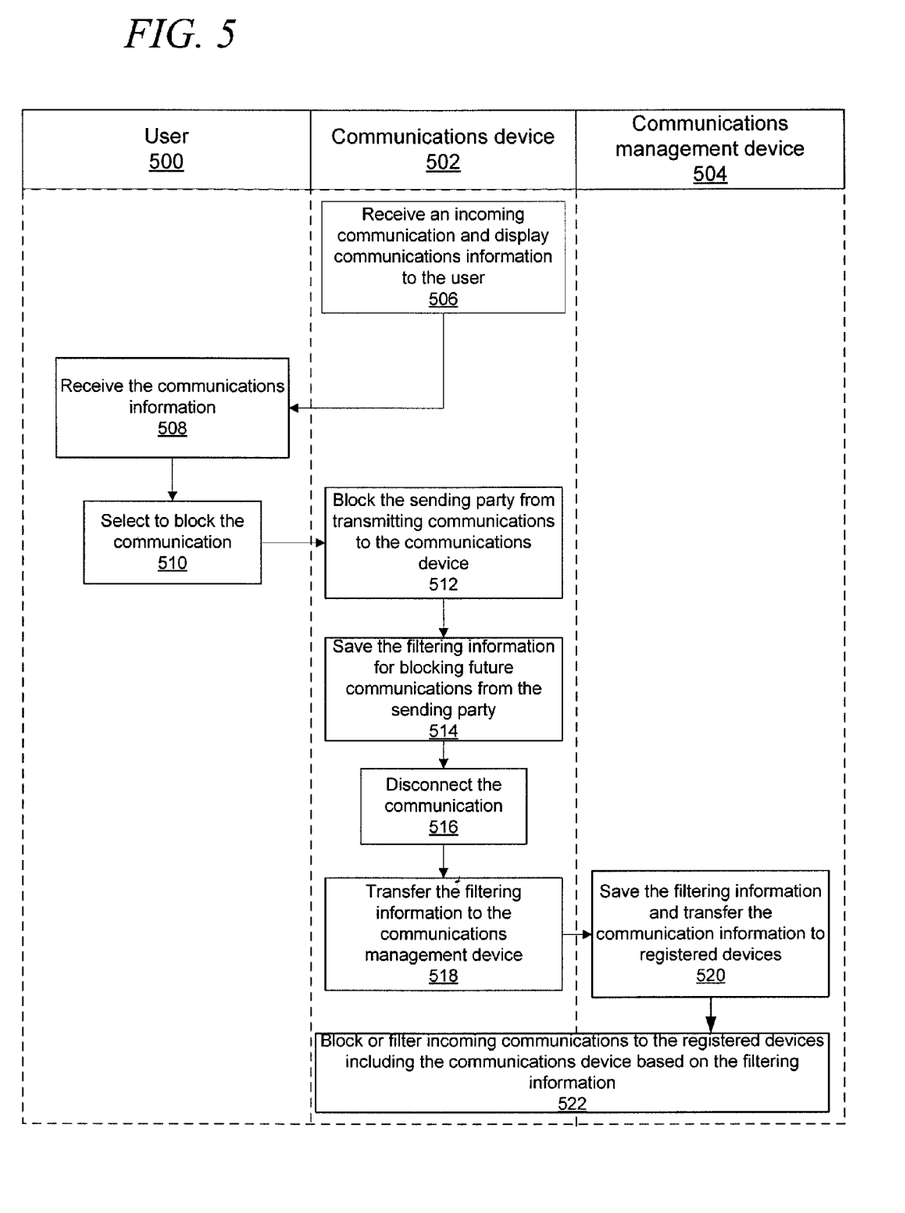
FIG. 5 is a flowchart of a process for blocking unwanted communications in accordance with an illustrative embodiment.

In one embodiment, the application may further include the filtering add-on 418. The filtering add-on 418 is an interface to the application configured to facilitate filtering communications. The filtering add-on 418 may be configured to receive a command from a user to block a communication. The filtering add-on 418 may extract the information and send it to the filtering portal 400 through the device interface 412. In one embodiment, the filtering information database 406 may synchronize a file or content with the filtering add-on 418 to prevent unwanted communications from interrupting a user utilizing the client platform 414. The filtering portal 400 or the client platform 414 may be utilized FIG. 5 is a flowchart of a process for blocking unwanted communications in accordance with an illustrative embodiment. In one embodiment, the process of FIG. 5 may be implemented by a user 500, a communications device 502, and a communications management device 504. The communications device 502 may be any device enabled for communications, including but not limited to, a cell phone, POTS phone, VoIP phone, television, fax machine, PDA, mp3 player, laptop, or computer. The communications management device 504 may be one or more network devices, platforms, applications, or modules.

The process of FIG. 5 may begin with the communications device 502 receiving an incoming communication and displaying communications information to the user (step 506). The incoming communication may be a phone call, text message, email, or other verbal, textual, or data communication. The communications information displayed to the user may specify the time the message was received or processed, subject, the sending or calling party, caller identification information, such as name and phone number, or other information that may be extracted from the call. In one embodiment, the communications device 502 or the communications management device 504 may be configured to search for key words or other high value information included in the communication. For example, the communications management device 502 may determine whether the name of the user 500 is specifically included in the communication. The communications information may be redacted, filtered, or otherwise limited to only the information relevant to the user for determining whether to accept or block the communication and future communications.

Next, the user 500 receives the communications information (step 508). The information may be received audibly, visually, or tactilely. In particular a speaker or display of the communications device 502 may play or present the communication to the user 500. In one embodiment, the user 500 may determine whether the communicating party is listed in a network address book of the communications device 502.

The user 500 may then select to block the communication (step 510). The user may make a selection to block the communication in any number of ways. In one embodiment, the user may say a verbal command, such as "block call" or "block text message". The user may also activate a soft button, key, or other interface element of the communications device. Fore example, the communications device 502 may include a button dedicated for marking communications as unwanted for filtering future communications that include the filtering information extracted from the current communication. In one embodiment, the user may tap the communications device 502 three times in rapid succession in order to enter a command to block an incoming email.

Next, the communications device 502 blocks the sending party from transmitting communications to the communications device (step 512). During step 512, the attempted or ongoing communication is blocked as well as future communications from the sending party. The communications may be blocked at the communications device 502, the communications management device 504, or other network devices, software, or elements of the communications service provider. In one embodiment, the filtering information may include email addresses, phone numbers, websites, or other information that is associated with the filtering information that may be used to block other communications. For example, a spam email may list a number to call for additional information. Future phone calls received from that number or very similar to that number may be blocked because of their association with the email that was previously selected to be blocked. An algorithm may be used for avoiding false positives and blocking legitimate contacts, companies, and so forth that may be included in the filtering information extracted from the communication to the user 500.

The communications device 502 saves the filtering information for blocking future communications from the sending party (step 514). The communications device 502 may permanently update a memory or temporarily update a cache for transferring the filtering information. The filtering information from a number of communications devices may be stored both locally and synchronized to each of the communications devices by the communications management device 504.

The communications device 502 disconnects the communication (step 516). The communication may be disconnected by terminating the communication, deleting it, or otherwise disassociating the communication with the user 502 and the communications device 502.

The communications device 502 transfers the communication information to the communications management device (step 518). In one embodiment, the transfer may occur immediately once the communication is blocked. In another embodiment, the communication of the filtering information from the communications device to the communications management device 504 may only occur when the communications device is not in use or bandwidth usage is below a specified threshold.

Next, the communications management device 504 saves the filtering information and transfer the communication information to registered devices (step 520). The filtering information may be stored in a database, memory, or other device or format that may be managed the user. For example, the filtering information may be accessible by the user through a web portal. The user may set preferences, manually add blocking information, or otherwise configure how communications blocking is implemented across the registered devices. The registered devices are the communications devices associated with the user. In one embodiment, the registered devices may be associated with the user automatically based on services purchased through a communications service provider. In another embodiment, the user may manually link or associate a number of communications devices, accounts, soft phones, applications or other communications constructs.

The process may end with the communications device 502 and the communications management system 504 blocking incoming communications to the registered devices including the communications device (step 522).

In the illustrative embodiments, the user 500 may block an incoming communication in real time. The relevant filtering information may then be passed to other registered devices for similarly blocking communications.

Figure 6:
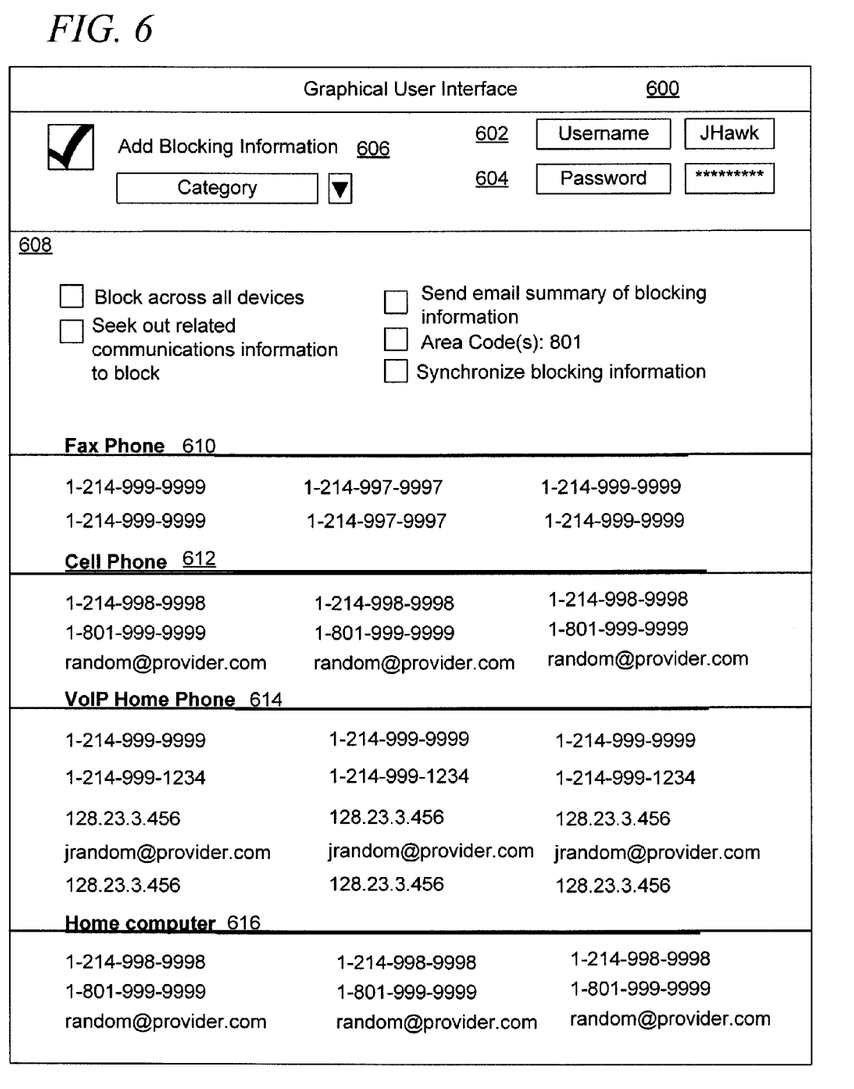
FIG. 6. is a graphical user interface for blocking unwanted communications in accordance with an illustrative embodiment.

FIG. 6. is a graphical user interface for blocking unwanted communications in accordance with an illustrative embodiment. The graphical user interface 600 is a particular implementation of the graphical user interface 226 of FIG. 2. The graphical user interface 600 may be displayed or otherwise presented to any number of communications devices. The graphical user interface 600 may be presented on a screen, monitor, Braille interface, or other element for receiving user feedback and input. In one embodiment, the graphical user interface 600 is presented to a user through a client, such as a laptop computer. The graphical user interface may include a username 602, password 604, an indicator 606, user preferences 608, and sections 610, 612, 614, and 616.

The graphical user interface 600 may be used to display blocking information to the user and receive user preferences, manual selections, and other data and information from the user. The username 602 is the name, account number, or other identifier associated with the account. The password is an authentication element ensuring that only user(s) that are authorized may view and manage the blocking information through the graphical user interface 600.

The indicator 606 is an interface element for receiving a user selection to add blocking information. The indicator may be a button, soft key, portion of a touch screen, radio button, icon, toggle, or other software or hardware interface element. In one embodiment, the user may activate the indicator 606 in order to add blocking information for a specified category as shown in sections 610, 612, 614, and 616. Additionally, the user may be able to select the type of blocking information, such as a phone number, username, IP address, MAC address, email address, or other, the user is entering.

The user preferences 608 are the customizable instructions that govern how the communication blocking feature is implemented. In one embodiment, the user may be able to specify whether to block communications across all registered devices. The user may also select to extract or mine incoming communications to retrieve blocking information that may be used to block additional types of communication. For example, email addresses or phone numbers included in a text message may be extracted to block additional emails or phone calls. The user may also select to receive an email summary of blocking information. In one example, The summary may list the amount and types of calls blocked to the registered devices. The user preferences 601 may also allow a user to specify generic blocking information, such as an area code, name, domain name, communications service provider or other similar information. The user may also indicate if and how the blocking information is synchronized with other devices. The blocking information may be stored centrally in a server accessible by each registered communications devices. In another embodiment, a local copy of the blocking information may be communicated to each of the registered devices for permanent or temporary storage. In another embodiment, the user preferences 608 may also list each of the registered communications devices and include interactive elements for adding or removing additional communications devices, accounts, addresses, or applications.

Sections 610, 612, 614, and 616 may be the blocking information registered for each of the fax phone, cell phone, VoIP home phone, and home computer respectively. These sections 610, 612, 614, and 616 may include information for any number of devices. The blocking information may be new blocking information added for each of the registered devices. Alternatively, the blocking information included in sections 610, 612, 614, and 616 may be the total blocking information as received from each of the registered devices. As previously described, the blocking information in sections 610, 612, 614, and 616 may include phone numbers, email addresses, usernames, names, account numbers, domains or other information used in communications.

What is claimed as new and desired to be protected by Letters Patent of the United States is:

1. A method for preventing unwanted communications, the method comprising:
   receiving a communication from a sending party;
   receiving an input indicating the communication is to be blocked;
   extract filtering information from the communication;
   distributing the filtering information to a plurality of telecommunications platforms; and
   blocking the communication and future communications across the plurality of telecommunications platforms utilizing the filtering information.

2. The method of claim 1, wherein the plurality of telecommunications platforms are for analog communications, analog transmissions, digital communications, and digital transmissions.

3. The method of claim 2, wherein the plurality of telecommunications platforms include voice communications, data communications, and wireless communications.

4. The method of claim 1, wherein the communication or future communication is any of a phone call, a text message, an email, a chat message, an advertising commercial, and a fax.

5. The method of claim 1, wherein the input is specified by a user for blocking one or more communications, the distributing includes sending the filtering information to a plurality of devices or updating a filtering database.

6. The method of claim 1, wherein the blocking step further comprises:
   terminating or deleting the one or more communications.

7. The method of claim 1, wherein the filtering information identifies information about a sending party for performing the blocking, wherein the filtering information is compiled and synchronized for a plurality of users.

8. The method of claim 1, wherein the filtering information includes any of a phone number, an email address, a domain name, a username, an account number, a name, a nickname, an area code, and wherein the plurality of telecommunication platforms include any of a phone, a set-top box, a computing device, a fax machine, a wireless device, a soft phone, a television, and a software application.

9. The method of claim 1, further comprising:
expanding the filtering information to include additional information utilizing the filtering information to perform data mining; and
distributing the filtering information to the plurality of telecommunications platforms at a predefined period.

10. The method of claim 1, further comprising:
storing the filtering information in a server accessible through a portal, wherein one or more users manage the filtering information through the portal; and
performing the distributing through the portal.

11. The method of claim 1, further comprising:
communicating the filtering information to one or more users for review, the filtering information being communicated from a filtering database compiling the filtering information for the one or more users.

12. A server for filtering communications, the server comprising:
an interface operable to communicate with registered devices, wherein the interface receives input indicating a communication is to be filtered;
an extractor operable to extract filtering information from the communication;
a memory operable to store the filtering information to filter future communications with the registered devices; and
a processor operable to filter future communications to the registered devices across a plurality of telecommunications platforms utilizing the filtering information.

13. The server according to claim 12, wherein the interface includes a portal for distributing the filtering information and receiving updates for the filtering information from the registered devices.

14. The server according to claim 13, wherein the registered devices block the future communications utilizing the filtering information, wherein the registered devices are utilized by a plurality of users, and wherein the plurality of telecommunications platforms include communications platforms, computing platforms, and media platforms.

15. The server according to claim 13, wherein the registered devices are any of a phone, a computer, a fax machine, a wireless device, a soft phone, and a software application, and wherein the filtering information includes any of a phone number, an email address, a domain name, a username, an account number, a name, a nickname, and an area code.

16. The server according to claim 12, further comprising:
a database for storing the filtering information, wherein the filtering information is uploaded to the registered devices at a pre-set interval or based on an event according to user preferences, wherein the extractor is further operable to expand the filtering information to include additional information utilizing the filtering information to perform data mining.

17. A communications server for blocking communications comprising:
a processor for executing a set of instructions; and
a memory for storing the set of instructions, wherein the set of instructions are operable to:
receive a communication from a sending party;
receive a input indicating the communication is to be filtered;
extract filtering information from the communication;
communicate the filtering information to a plurality of telecommunications platforms; and
block the communication and future communications across the plurality of telecommunications platforms utilizing the filtering information.

18. The communications server according to claim 17, wherein the set of instructions ends the communication or deletes the communication in response to a user selection, and wherein the communication is any of a phone call, a text message, an email, a chat message, an advertising commercial, and a fax, and where wherein the devices are any of a phone, a computing device, a set-top box, a fax machine, a wireless device, a soft phone, and a software application.

19. The communications server of claim 17, wherein the filtering information is extracted by input from a plurality of users, and wherein the filtering information is distributed for blocking future communications to devices associated with plurality of users.

20. The communications according to claim 17, wherein the set of instructions are further operable to expand the filtering information to include additional information utilizing the filtering information to perform data mining, and wherein one or more users access the filtering information through a portal, and wherein the set of instructions is operable to:
collect filtering information from a plurality of telecommunications platforms registered to a plurality of users.

* * * * *